United States Patent [19]
Pitt

[11] Patent Number: 5,158,032
[45] Date of Patent: Oct. 27, 1992

[54] DOCK DOLLY

[76] Inventor: Nigel A. Pitt, Rte. 2, Box 2670, Hartwell, Ga. 30643

[21] Appl. No.: 675,446

[22] Filed: Mar. 26, 1991

[51] Int. Cl.$^5$ .............................................. B60P 1/14
[52] U.S. Cl. ................................. 114/263; 180/7.5; 280/47.27; 405/218; 414/457; 414/490; 414/786
[58] Field of Search ............ 414/490, 786, 373, 402, 414/559, 434, 437, 439, 442–444, 457; 180/7.5; 280/47.27, 47.131, 46; 114/344, 263; 254/4 R, 4 B, 226, 227, 262, 263, 323, 325; 405/218–221

[56] References Cited

U.S. PATENT DOCUMENTS

| | | | |
|---|---|---|---|
| 411,209 | 9/1889 | Hightree | 254/226 |
| 472,338 | 4/1892 | Concannon | 414/437 |
| 779,215 | 1/1905 | Gale | 414/444 |
| 1,342,585 | 6/1920 | Callahan | 280/47.27 X |
| 1,383,666 | 7/1921 | Rosemeyer | 254/227 X |
| 2,420,001 | 5/1947 | McCollum | 414/434 |
| 2,479,099 | 8/1949 | Cerny | 414/457 |
| 2,623,760 | 12/1952 | Fornelius | 280/47.27 X |
| 2,851,179 | 9/1958 | Vance | 414/444 |
| 3,038,622 | 6/1962 | Quayle | 414/434 |
| 3,191,786 | 6/1965 | Langrell | 414/444 |
| 3,414,087 | 12/1968 | Schmiesing | 254/4 R X |
| 3,512,755 | 5/1970 | Donakowski | 254/8 R |
| 3,667,728 | 6/1972 | Garelick | 254/8 R |
| 3,913,762 | 10/1975 | Alexander | 414/490 |
| 3,953,048 | 4/1976 | Vincent et al. | 414/444 X |
| 4,052,080 | 10/1977 | Hedderich et al. | 414/490 X |
| 4,084,711 | 4/1978 | Armstrong | 414/559 X |
| 4,321,004 | 3/1982 | Mills | 414/490 |
| 4,435,115 | 3/1984 | Orstad et al. | 414/490 |
| 4,505,489 | 3/1985 | Specie | 280/47.131 |
| 4,737,065 | 4/1988 | Ju | 414/490 |
| 5,070,678 | 12/1991 | Morrill | 414/490 X |

FOREIGN PATENT DOCUMENTS 963732  4/1957  Fed. Rep. of Germany ...... 414/559

OTHER PUBLICATIONS

Advertisement for Florida Sailcraft, Inc. from Jan.-/Feb. 1991 issue of *Hobie Hotline*.
Assembly instructions for the Florida Sailcraft Tiger Trax beach wheels advertised in Jan./Feb. 1991 issue of *Hobie Hotline*.

*Primary Examiner*—David A. Bucci
*Attorney, Agent, or Firm*—Kilpatrick & Cody

[57] ABSTRACT

A dock dolly comprising a frame having a handle, a lifting plate and an axle mounted on the frame between the handle and the lifting plate; at least one molded, hollow, thermoplastic wheel having a diameter to width ratio of approximately less than 2 mounted on the axle; a winch having a line mounted on the frame between the axle and the handle; a top line roller mounted on the handle; and a bottom line roller mounted on the axle.

1 Claim, 2 Drawing Sheets

DOCK DOLLY

BACKGROUND OF THE INVENTION

Boat dock owners have long struggled with the problem of moving their docks in response to varying lake levels. This problem is especially prevalent for boat dock owners whose docks are located on flood control lakes owned by the U.S. Army Corps of Engineers because the Corps of Engineers frequently raises and lowers lake levels in response to varying water demands downstream. In addition, the Corps of Engineers owns the perimeter strip of land immediately surrounding the lake and will not permit any privately owned, permanent boat docks to be built. Boat dock owners living on Corps of Engineers lakes, therefore, are limited to boat docks that are temporarily moored to the shore. As the shoreline moves in and out with the rise and fall of the lake, the boat dock must also be moved in and out, a difficult task made even more difficult by the soft, muddy, slippery conditions found along most shorelines and the Corps of Engineers' prohibition of motorized vehicles.

Boat docks generally are moored by placing the end of a long ramp on a dry part of the lake bank. The dock is secured to any convenient mooring, such as a tree or a stake, and only the end of the ramp actually touches the ground. The dock itself freely floats on the lake on pontoons, and can be moved about by pushing or pulling on the ramp. However, before moving the dock, the end of the ramp must by picked up off the ground, a difficult task considering the ramp can weigh several hundred pounds. Additionally, even though the dock is floating on the water, it too is extremely heavy and requires significant effort to move.

Prior to the present invention, boat dock owners used various techniques to accomplish the difficult task of moving their boat docks. Not surprisingly, most of these techniques involved large amounts of physical labor For example, some dock owners enlist the help of other people to pick up the dock ramp and push the dock further out into the lake or pull the dock closer to shore. This method is quite effective assuming one can locate a sufficient number of willing family members or neighbors.

Others place logs or steel pipe under the boat dock ramp so that the ramp will roll along the logs or pipes. A power boat is then tethered to the dock and used to push the dock into the shore or pull the dock away from the shore. As the ramp rolls along and exposes logs or pipe, the exposed logs or pipe must be picked up and repositioned ahead of the movement of the ramp. While effective, this method is laborious, time consuming, messy and requires a handy supply of suitable logs or pipe.

Still others mount on the ramp end an axle that has been fitted with pneumatic or semi-pneumatic golf cart wheels. While the wide, soft, golf cart wheels resist becoming mired in the mud, they quickly rust and must be replaced. Additionally, these modified axles do not contain any means for moving the boat dock, once again requiring the dock to be pushed in or pulled out by hand or a tethered boat.

BRIEF SUMMARY OF THE INVENTION

The present invention improves prior art methods of moving boat docks by providing a dock dolly with a built-in winch to simultaneously lift a portion of a dock or a dock ramp onto the dolly and transport it toward or away from shore. The dolly has a rigid, rust-resistant frame, an axle, wide, light weight, rust-resistant polyethylene wheels, a winch and winch rollers. The axle is either welded or bolted to the frame near one end and the wheels are retained on the axle by nylon and stainless steel washers and stainless steel cotter pins. The wheels are hollow, molded thermoplastic that have a low diameter to width ratio so that the wheels do not bog down in soft ground. The axle/wheel combination uses plastic rod bearings which are durable and will not rust.

A rigid plate is welded onto the end of the frame near the axle. The plate is parallel to the axle, spaced between the wheels, engages the end of the boat dock ramp and lifts the boat dock ramp when a handle located on the opposite end of the frame is pivoted downward. Two plastic rollers are mounted on the frame, one on the handle and one on the axle. A winch having a line such as a polyester strap, stainless steel cable or chain is mounted on the frame between the axle and the handle.

In use, the line is looped around the roller mounted on the handle and is attached to a stake or a tree further uphill on the bank. When the winch is turned so as to reel in or shorten the line, the handle is pulled downward by the line pulling on the handle roller, thereby rotating the frame within the wheels and lifting the plate and the end of the boat dock ramp. Once the end of the boat dock ramp has been lifted off of the ground, further shortening of the line causes the frame to be propelled toward the stake or tree, thereby pulling the boat dock closer to shore.

Alternatively, two stakes can be placed near the waterline of the lake, or even underwater in the lake, on either side of the ramp. A rope or wire is looped over the ramp and attached on either end to the stakes. The winch line is then looped through the handle roller and then around the axle roller and attached to the rope or wire loop. Initially urging the frame to rotate by hand and shortening the line by winching in the line has the same lifting effect on the plate and the boat dock ramp described above. However, use of the axle roller causes the frame and the boat dock ramp to be pushed away from shore and farther into the water.

Accordingly, one objective of the present invention is to provide a dolly that is suitable for use on soft ground.

Another objective of the present invention is to provide a dolly that will simultaneously lift and propel a boat dock ramp.

Another objective of the present invention is to provide a dolly that is rust-resistant.

These and other objectives and advantages of the present invention will become apparent by reference to the drawings and the detailed description and claims which follow.

DETAILED DESCRIPTION OF THE DRAWINGS

Figure 1:
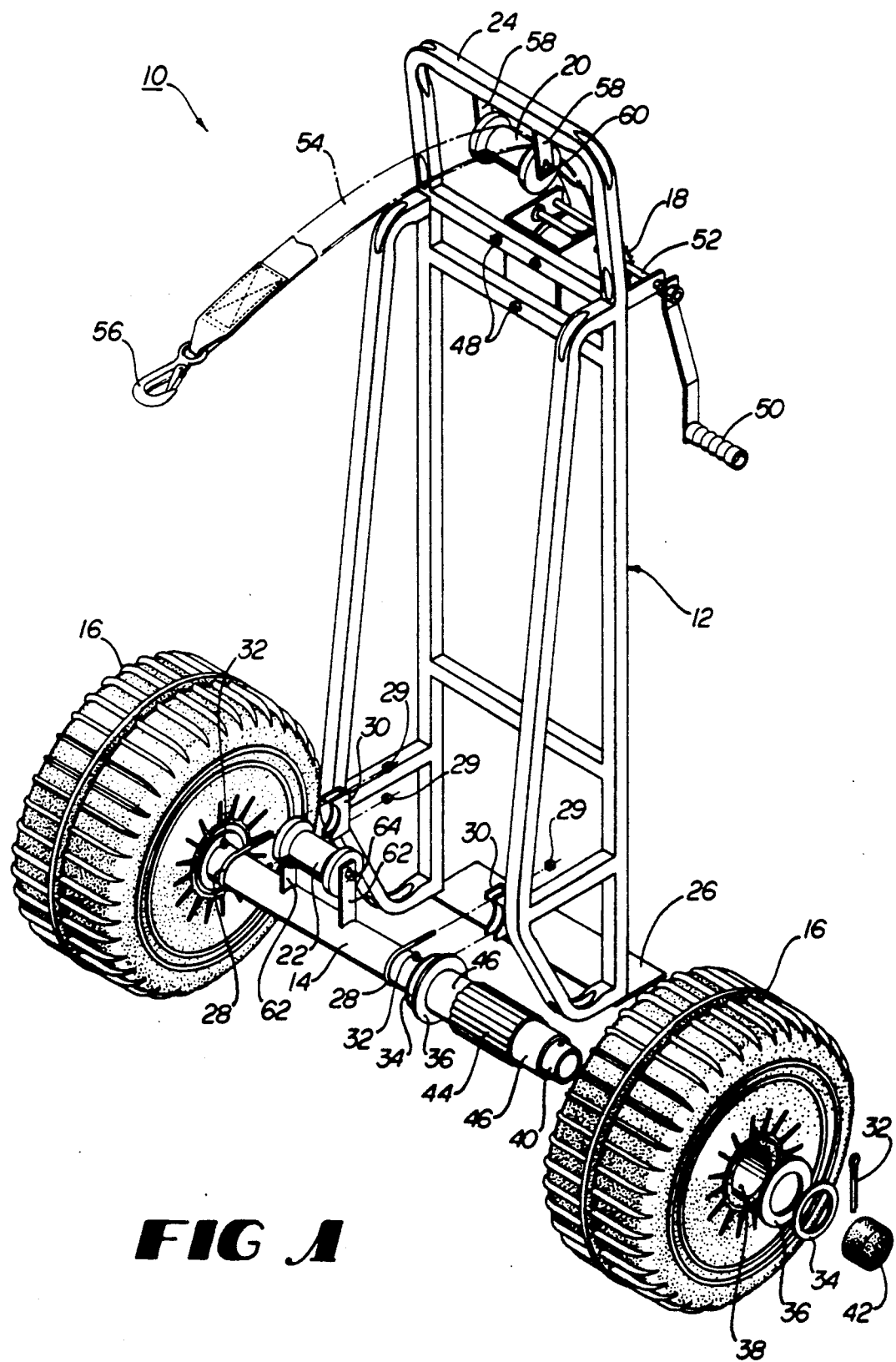
FIG. 1 is a prospective view of the dock dolly of the present invention with the axle exploded away from the frame and one wheel exploded away from the axle.

Dock dolly 10 includes a generally sled-shaped frame 12 which has a handle 24 on one end and a lifting plate 26 welded on the other end. Axle 14 is mounted on frame 12 slightly above plate 26 so that when wheels 16 are mounted on axle 14, frame 12 will stand upright, resting on wheels 16 and plate 26. Axle 14 may be mounted to frame 12 by U-bolts 28, nuts 29 and brackets 30 or by welding axle 14 to frame 12 (not shown).

Frame 12 is preferably made of 1" square, 16 gauge steel tubing, axle 14 is preferable made of 2" outside diameter 11 gauge round steel tubing, and plate 26 is preferably 18" by 3" and made of 3/16" steel plate. Frame 12, axle 14 and plate 26 are preferably made rust-resistant by hot dip galvanizing but other suitable rust-resistant treatments, such as cold galvanizing, powder coating, red oxide primer or other coatings or platings may also be used. Those skilled in the art will recognize that frame 12, axle 14 and plate 26 may also be made of any suitable inherently rust-resistant material such as aluminum, aluminum alloy, stainless steel or fiberglass reinforced plastic, thereby eliminating the need for a rust resistant treatment.

As can be seen in FIG. 1, wheels 16 have aluminum hubs 38 that are of larger interior diameter than the exterior diameter of axle 14 so that hubs 38 can be received on the ends 40 of axle 14. Hubs 38 are integrally molded into wheel 16 and wheel 16 is preferably hollow and made of rigid, molded thermoplastic such as polyethylene. Wheels 16, commonly referred to as "beach wheels," are well-known and available from such sources as Florida Sailcraft, Inc., Ft. Lauderdale, Fla. and Dunn Plastics. Although any suitably sized wheels 16 may be used, it is preferable that wheels 16 have a diameter to width ratio of approximately less than 2, for example, 19" in diameter and 10" wide (19/10=1.9) or 21" in diameter and 12" wide (21/12=1.75), so that axle 14 will be suitably near the ground but the width of the wheels will be adequate to avoid unduly sinking into the soft ground. Hubs 38 are captured on axle 14 by sandwiching hubs 38 between identical stainless steel cotter pins 32, stainless steel washer 34 and nylon washers 36 so that wheels 16 do not touch frame 12. An end cap 42 is place over end 40 of axle 14 to prevent dirt and debris from entering the interior of axle 14.

Hubs 38 rotate about axle 14 on rod bearings 44 which are preferable made of any hard, abrasion-resistant plastic such as nylon or polyoxymethylene (known under the trade name DELRIN ®). Spacers 46 center rod bearings 44 within hub 38. Spacers 46 are preferably made of polyvinyl chloride.

Dolly 10 contains winch 18 having a handle 50 that is mounted to frame 18 by bolts 48. Although the mounting location of winch 18 on frame 12 is not critical, it is preferred that winch 18 be mounted between handle 24 and axle 14 and centered from side to side within frame 12 so that winch handle 50 is never more than approximately five feet from plate 26 when handle 50 is turned. A handle extension 52 allows handle 50 to clear frame 12 while being turned. Winch 18 is preferably made of stainless steel or hot dip galvanized steel and can be of any suitable size or capacity such as a 1400 pound winch with a 4.5:1 gear ratio or a two speed, 1800 pound winch with a 10.5:1 final gear ratio. Such winches are widely available from manufacturers such as Dutton-Lainson Co. Winch 18 also contains line 54 having a hook 56. Line 54 is preferably a polyester strap with a breaking strength of 4000 pounds, but other suitable materials such as a nylon strap, a stainless steel cable or a chain may also be used. Alternatively, winch 18 can be driven by an electric motor (not shown).

Dolly 10 also contains top line roller 20 and bottom line roller 22. Top line roller 20 is bolted to flanges 58, which are welded centered from side to side on handle 24, by spindle 60 so that top line roller 20 freely rotates on spindle 60. Bottom line roller 22 is bolted to flanges 62, which are welded centered from side to side on axle 14, by spindle 64 so that bottom line roller 22 freely rotates on bolt 64. Rollers 20 and 22 may be of any suitable size but 4" plastic spool rollers are preferred. Spindles 60 and 64 are preferably stainless steel, zinc plated or cadmium plated steel and are held on flanges 58 and 62, respectively, by cotter pins (not shown).

Figure 2:
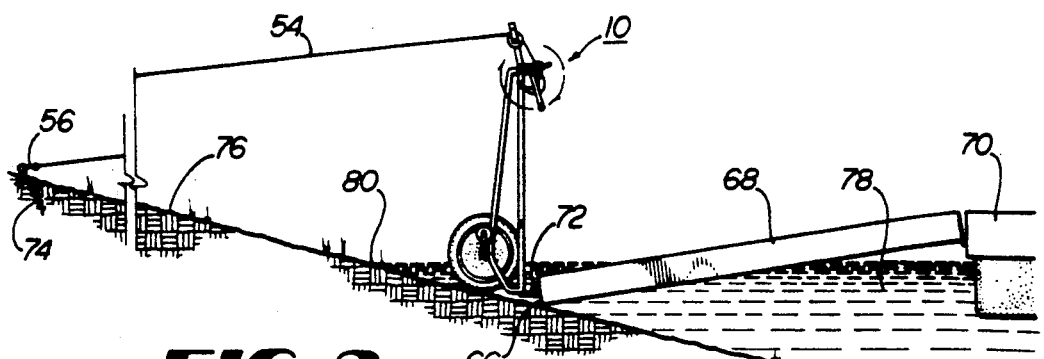
FIG. 2 is an elevational section of the dock dolly of FIG. 1 engaging the edge of a boat dock ramp in preparation for pulling the boat dock closer to shore.
Figure 3:
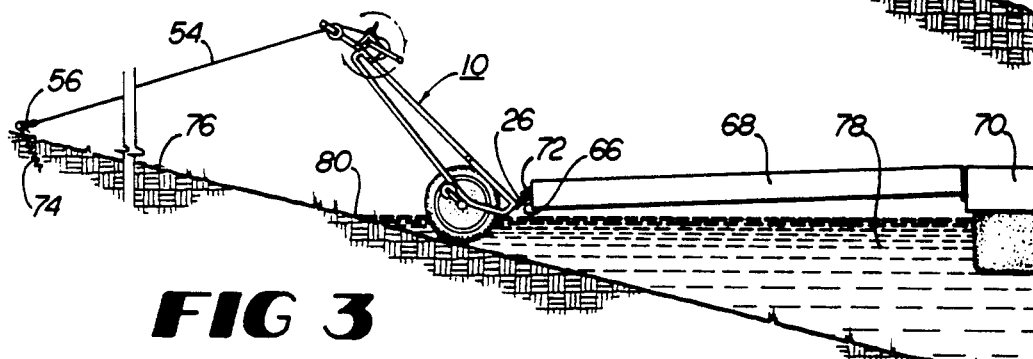
FIG. 3 is an elevational section similar to FIG. 2 but forward in time and depicts the dock dolly of FIG. 1 pulling a boat dock closer to shore.

As can be seen in FIGS. 2 and 3, in use, dolly 10 is positioned so that plate 26 can be slid underneath the end 66 of boat dock 70 ramp 68. To avoid lifting ramp end 66 in order to slide plate 26 underneath, lip 72 may be bolted or welded to ramp end 66 so that plate 26 engages lip 72. Once plate 26 is underneath ramp end 66 or engaged with lip 72, line 54 is unrolled from winch 18, looped over top line roller 20 and hook 56 is fastened to stake 74 located further uphill on the bank 76 of lake 78 away from ramp end 66. Line 54 is looped over roller 20 in order to take advantage of the full length of frame 12 as a lever while at the same time allowing more flexibility in mounting winch 18.

As can be seen in FIG. 3, once hook 56 is attached to stake 74, winch handle 50 is turned, shortening (or reeling in) line 54. As line 54 is shortened, the tension in line 54 pushes downward on top line roller 20, thereby causing frame 12 and axle 14 to rotate within hub 38. As frame 12 rotates, handle 24 is drawn down toward bank 76 and plate 26, which is on the opposite side of axle 14, is lifted up away from bank 76. Frame 12 rotates rather than being drawn toward stake 74 because ramp end 66 is attached to plate 26 and rests on bank 76. Frame 12 will move only minimally toward stake 74 until plate 26 has rotated sufficiently upward to raise ramp end 66 off bank 76. Once ramp end 66 has been raised off bank 76, equilibrium is established and frame 12 ceases to rotate. Further shortening of line 54 by winch 18 instead propels dolly 10, and consequentially, ramp end 66, ramp 68 and dock 70 toward stake 74. Once dock 70 has been brought into shore a sufficient amount to allow ramp end 66 to rest on dry land, the tension in line 54 is released by counter-rotating handle 50, thereby allowing frame 12 to return to a substantially upright position and ramp end 66 to be lowered to rest on bank 76.

If the slope on bank 76 is extremely steep, a third wheel (not shown) may be positioned on a second axle (not shown) which is located on frame 12 between handle 24 and axle 14. The addition of a third wheel (not shown) allows dolly 10 to traverse a steep bank 76 without digging handle 50 into bank 76 while turning handle 50.

Figure 4:
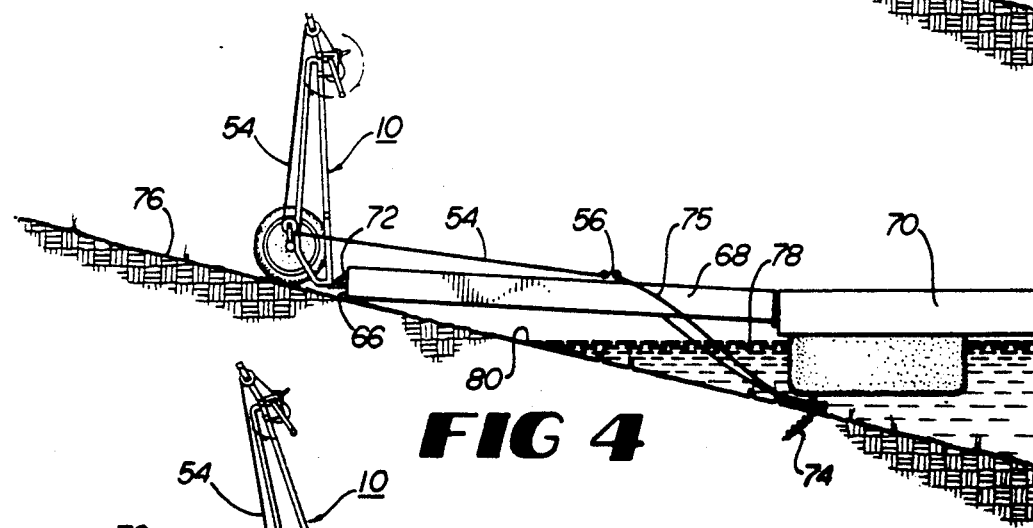
FIG. 4 is an elevational section similar to FIG. 2 except the dock dolly is engaged to the boat dock ramp in preparation for pushing the boat dock out from shore.
Figure 5:
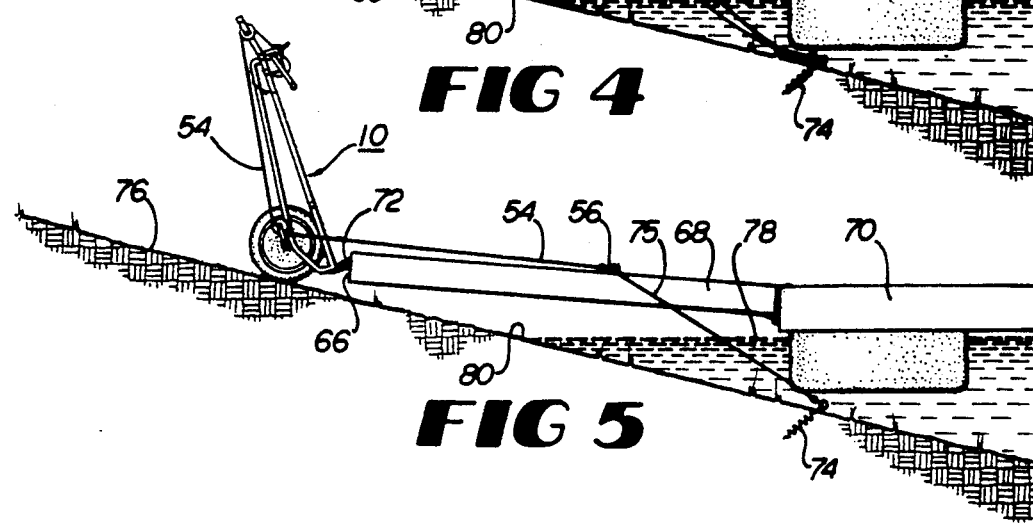
FIG. 5 is an elevational section similar to FIG. 4 but forward in time and depicts the dock dolly of FIG. 1 pushing a boat dock away from shore.

As can be seen in FIGS. 4 and 5, dolly 10 can also be used to push dock 70 away from bank 76 when ramp 68 is too far up on bank 76. To push dock 70, two stakes 74 are driven into bank 76 near or in the waterline 80 of lake 78 on either side of ramp 68. A rope or wire 75 is looped over ramp 68 and attached to stakes 74. Line 54 is looped through top line roller 20 and bottom line roller 22 and hook 56 is attached to looped wire 75. By looping line 54 through top line roller 20 and bottom line roller 22, shortening line 54 by turning handle 50 has the same rotational effect on frame 12 as described above. However, frame 12 may need to be initially urged to rotate by pushing down by hand on handle 24. Once ramp end 66 has been raised, further shortening of line 54 likewise causes frame 12 to be propelled toward stakes 74. However, placement of stakes 74 at waterline 80 and use of bottom line roller 22 cause the movement of the dolly 10 to be toward lake 78, thereby pushing dock 70 further out into lake 78.

This description is given for purposes of illustration and explanation. It will be apparent to those skilled in the relevant art that modifications and changes may be made to the invention described above without departing from its scope and spirit.

I claim:

1. A method for lifting and moving a dock structure utilizing a dock dolly comprising a generally sled-shaped frame having two ends; two wheels and a lifting plate mounted near one of the frame ends; a line-winding winch and a line roller mounted near the other end of the frame; and a line having two ends, one of which is attached to the winch, comprising the steps of:
   a) attaching the other end of the line to a securing point;
   b) placing the lifting plate under the dock structure to be moved with the frame oriented in a near vertical position; and
   c) operating the winch to draw the line into the winch, thereby rotating the frame toward a horizontal position to lift the dock structure and urge the dock structure-bearing dolly toward the securing point.

* * * * *